United States Patent [19]

McDougall

[11] Patent Number: 4,749,235
[45] Date of Patent: Jun. 7, 1988

[54] COMPOSITE WHEEL CONSTRUCTION

[75] Inventor: Malcolm K. McDougall, Sterling Heights, Mich.

[73] Assignee: The Budd Company, Troy, Mich.

[21] Appl. No.: 1,694

[22] Filed: Jan. 9, 1987

Related U.S. Application Data

[62] Division of Ser. No. 673,903, Nov. 21, 1984, Pat. No. 4,636,344.

[51] Int. Cl.[4] .......................... B60B 21/00; B60B 5/02
[52] U.S. Cl. .................. 301/63 PW; 428/36; 428/65; 428/113
[58] Field of Search .................. 428/36, 65, 112, 113; 301/63 PW, 63 R, 65, 95

[56] References Cited

U.S. PATENT DOCUMENTS

| 2,485,827 | 10/1949 | Hartzell . | |
| 3,608,134 | 9/1971 | Cook . | |
| 3,917,352 | 11/1975 | Gageby | 301/63 |
| 4,017,348 | 4/1977 | Shumaker | 156/189 |
| 4,072,358 | 2/1978 | Ridha | 301/63 |
| 4,100,247 | 7/1978 | Shead et al. | 264/271 |
| 4,146,274 | 3/1979 | Lejeune | 301/97 |
| 4,173,992 | 11/1979 | Lejeune | 152/381.1 |
| 4,271,112 | 6/1981 | Rossman et al. . | |
| 4,294,490 | 10/1981 | Woelfel | 301/63 |
| 4,294,639 | 10/1981 | Woelfel et al. | 156/185 |
| 4,376,749 | 3/1983 | Woelfel | 264/258 |
| 4,483,729 | 11/1984 | Fujisaki et al. | 301/95 |
| 4,532,097 | 7/1985 | Daniels et al. . | |
| 4,532,169 | 7/1985 | Carley . | |

FOREIGN PATENT DOCUMENTS 1939910 2/1971 Fed. Rep. of Germany ........ 301/63 PW
0067104 4/1984 Japan .............................. 301/63 PW Primary Examiner—John E. Kittle
Assistant Examiner—Beth A. Bozzelli
Attorney, Agent, or Firm—Harness, Dickey & Pierce

[57] ABSTRACT

A fiber reinforced plastic composite wheel and method of making it is disclosed. The wheel includes a rim and a disc, with the disc comprising reinforcing fibers oriented predominantly in a radially outwardly extending direction. The rim, in the preferred construction, has a plurality of radially disposed and substantially distinct layers. The inner and outermost layers have fibers that extend essentially in the same direction, with one or more middle layers having fibers extending in an opposite direction. Preferably, the inner and outer layers have directional fibers extending essentially parallel to the wheel axes.

7 Claims, 4 Drawing Sheets

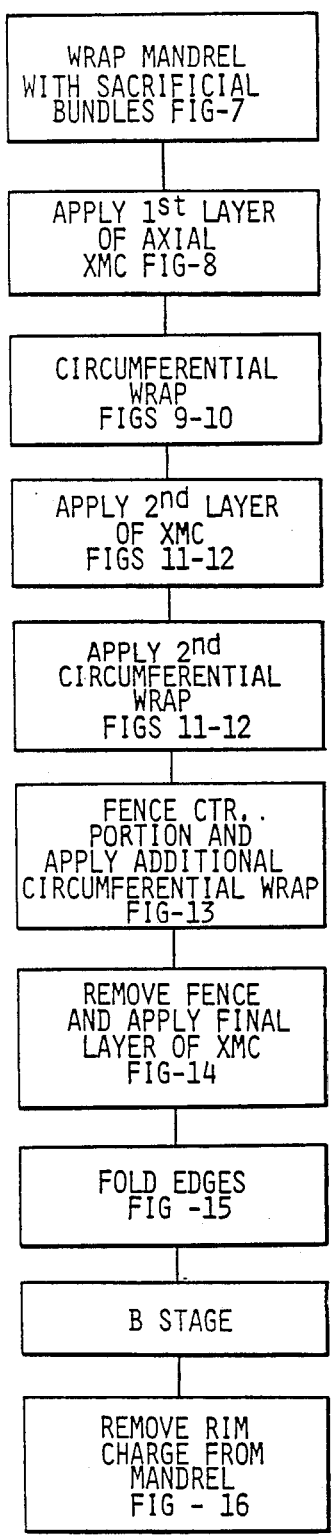
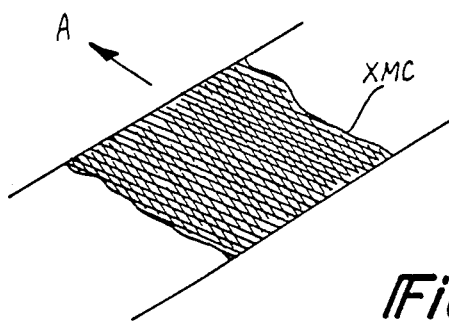
Fig-5
Fig-6
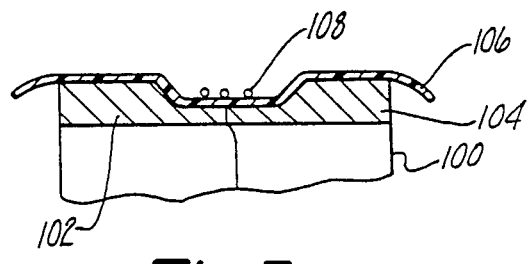
Fig-7
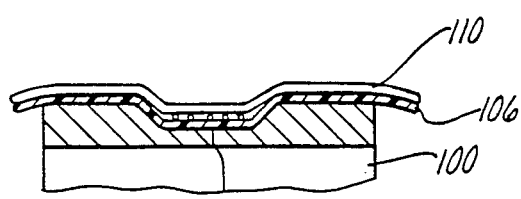
Fig-8

COMPOSITE WHEEL CONSTRUCTION

This is a division of U.S. patent application Ser. No. 673,903, filed Nov. 21, 1984, now U.S. Pat. No. 4,636,344.

TECHNICAL FIELD

This invention relates to vehicle wheels and, more particularly, to wheels constructed from fiber reinforced plastic resin.

BACKGROUND ART

Vehicle wheels have conventionally been made from steel or other metallic construction. While metal wheels have generally performed satisfactorily, they unfortunately are relatively heavy and expensive to manufacture in terms of capital investment for lower volumes.

In an effort to overcome these and other difficulties with metal wheels, it has been proposed to construct the wheels out of fiber reinforced plastic material. These are often referred to as composite wheels. Composite wheels show promise in that they are lighter weight and comparatively more economical in terms of capital investment for lower volumes to manufacture than conventional metal wheels.

The following is a respective, though not exhaustive, list of patents showing various composite wheel constructions:

U.S. Pat. No. 4,294,639 to Woelfel et al;
U.S. Pat. No. 4,376,749 to Woelfel;
U.S. Pat. No. 4,294,490 to Woelfel et al;
U.S. Pat. No. 4,173,992 to Lejeune;
U.S. Pat. No. 4,100,247 to Shead et al;
U.S. Pat. No. 4,017,348 to Shumaker;
U.S. Pat. No. 4,146,274 to Lejeune;
U.S. Pat. No. 3,917,352 to Gageby; and
U.S. Pat. No. 4,072,358 to Ridha.

Unfortunately, composite wheels have yet to gain wide acceptance. Composite wheels must meet or exceed higher standards than their metal counterparts in view of the relative newness of this structural material and its safety requirements. Such things as rim and disc fatigue, creep strength and environmental resistance are categories of tests performed.

The present invention is drawn to a new composite wheel construction and method of making it that is expected to provide good results in these test areas.

SUMMARY OF THE INVENTION

The improved wheel construction of the present invention employs a disc of fiber reinforced resin wherein short reinforcing fibers are predominantly oriented in a radially outwardly extending direction. The fatigue strength of such a disc construction compares favorably with known constructions where the fibers are randomly oriented in the disc.

In the preferred embodiment, the rim comprises a plurality of radially disposed and substantially distinct layers. The inner and outermost layers have fibers which extend essentially in the same direction. One or more middle layers are provided in which the fibers extend in a transverse direction to the inner and outermost layers. By balancing the construction so that the inner and outermost layers have fibers extending in the same direciton, warpage or molded-in stresses during the molding process tend to be minimized. In the preferred embodiment, the inner and outermost layers have directional fibers which extend in a direction essentially parallel to the wheel axis. This construction resists higher stresses in the axial direction. By providing the axially extending fibers in the inner and outermost layers of the rim, the rim is expected to achieve superior transverse bending strength characteristics.

In the method of making the wheel pursuant to this invention, a disc charge is formed with reinforcing fiber segments oriented essentially in a radially outwardly extending direction. An annular rim charge is formed from a plurality of radially disposed and substantially distinct layers. Alternate layers have directional fibers extending essentially in transverse directions, with the inner and outermost layers having fibers extending essentially parallel to the wheel axis. The disc and rim charges are compression molded to form an integral fiber-reinforced composite wheel. Preferably, the disc charge is formed by pulling strands of continuous raw fibers through a resin bath to impregnate the fibers with the resin. The resin impregnated strands are cut and then collected in a controlled manner so that the cut segments are piled together and lie in an essentially radially outwardly extending direction.

BRIEF DESCRIPTION OF THE DRAWINGS

The various advantages of the present invention will become apparent to one skilled in the art upon reading the following specification and by reference to the drawings in which:

FIG. 5 is a flow chart illustrating operational steps in forming the rim charge;

FIG. 6 is a perspective view of sheet molded compound material used to provide axially extending fibers in the preferred construction of the rim charge;

FIG. 7 is a cross-sectional view showing the formation of the rim charge at an early stage in the operation;

FIG. 8 is a cross-sectional view showing the formation of the rim charge at a subsequent stage;

DESCRIPTION OF THE PREFERRED EMBODIMENT

Figure 1:
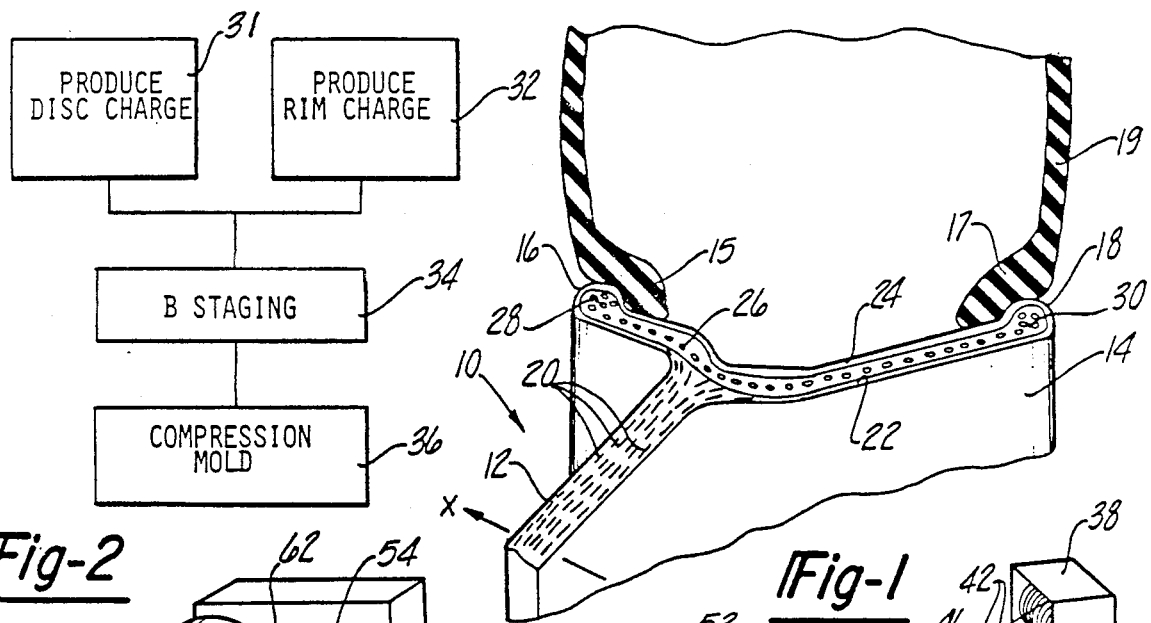
FIG. 1 is a partial perspective view of a portion of a composite wheel made in accordance with the teachings of this invention.

Briefly, the present invention is directed towards a composite wheel of fiber-reinforced resin such as that diagrammatically shown in FIG. 1. The wheel 10 has a disc 12 that lies generally in a plane perpendicular to the wheel axis which is designated by the arrow labeled "X". The outer periphery of disc 12 is joined to the inner surface of an annular rim 14. The axial ends of rim 14 are raised in the radial direction to form bead retaining flanges 16 and 18 for holding the beads 15, 17 of the tire 19 onto the wheel 10.

The disc 12 has reinforcing fibers 20 which all extend essentially in a radially outwardly extending direction from the wheel axis "X". As will be described herein, the disc 12 is formed from a disc charge formed by cutting resin impregnated strands into segments and allowing them to pile together in a controlled orientation to form the charge. Preferably, the fiber segments are ½ to 2 inches in length, with a length of 1 inch being presently preferred. Thus, the disc charge is to be contrasted with the use of stacked pre-cut sheets of sheet-molded compound (SMC) material in which the fibers therein extend in a random orientation.

The rim 14 is made from an annular rim charge. The rim charge consists of a plurality of radially disposed and substantially distinct layers. The inner and outermost layers have fibers which extend essentially in the same direction. One or more middle layers have fibers extending in a transverse direction. In the preferred construction, the rim 14 includes a first inner layer having directional fibers which extend in a direction essentially parallel to the wheel axis. This inner layer is shown diagrammatically in FIG. 1 at 22. During the molding process, the radially extending fibers 20 of the disc 12 flow towards the rim charge and join with the fibers in the innermost layer 22 to integrally bond the disc 12 to the rim 14. The preferred orientation of the disc fibers and rim fibers enable the fibers therein to generally lie parallel to one another, thereby facilitating a good bond therebetween.

The outermost layer in rim 14 is generally designed by the numeral 24. Outermost layer 24 has fibers therein which extend parallel to the wheel axis in a manner similar to the fibers in inner layer 22. Several advantageous results are obtained by having the inner and outermost layer with fibers extending in the same direction. This design provides a balanced construction that minimizes warpage or stresses in the rim that could be created during the molding process. By having the outmost layer 24 with axially extending fibers, the rim resists the tendency to bend under compressive loads. Such strength characteristics are enhanced by having the axially extending fibers on the outermost layer of the rim as compared with the case where the fibers are disposed in the middle or innermost layers.

One or more middle layers are provided between the inner 22 and outer 24 layers. At least one of the middle layers has fibers which extend circumferentially of the wheel axis. This layer is shown at 26 in FIG. 2. As will appear later herein, the preferred construction includes several middle layers with transversely directed fibers and for sake of simplicity, only one middle layer 26 is shown in FIG. 1.

In the preferred construction, the bead retaining flanges 16 and 18 have inner regious which consist essentially of long lengths of substantially continuous fibers extending circumferentially of the wheel axis. These fibers are schematically represented in FIG. 1 at 28 and 30. The continuous lengths of these fibers are cut in a staggered manner so that the fibers extend at least 180 degrees around the circumference of the wheel. The purpose of these fibers is to provide rim strength and stiffness in the circumferential direction. The intermittent cuts of the continuous fiber wraps facilitate expansion as the material flows to fill the mold.

More details about the composite wheel construction of the preferred embodiment can be obtained from reading the description of the method of this invention which follows.

Figure 2:
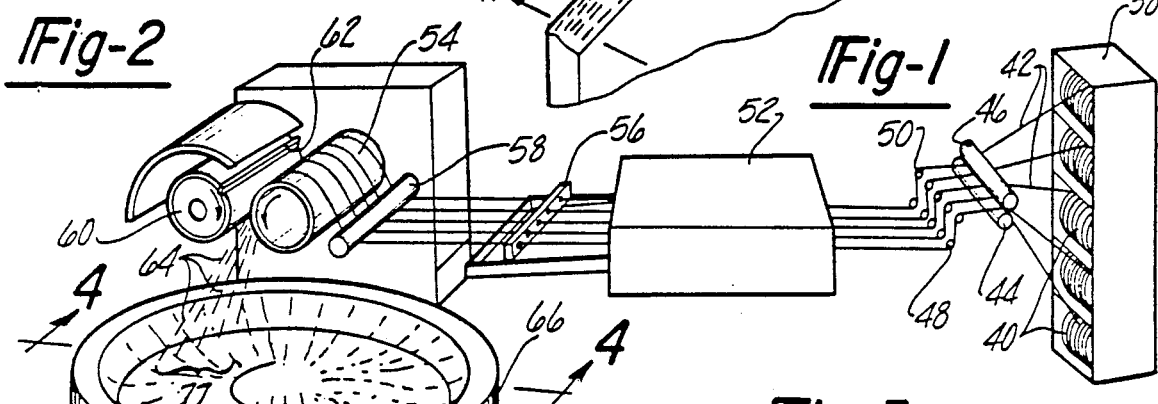
FIG. 2 is a flow chart illustrating the basic steps in forming the composite wheel of the present invention.

FIG. 2 outlines the general steps in forming the wheel 10. A disc charge and a rim charge are produced as represented by blocks 31 and 32. The resin in the charges is allowed to thicken to form a semi-solid mass which can be more easily carried and inserted into the mold. Preferably, the resin thickening process is accelerated by heating the charges. This is referred to in block 34 as "B-staging". Then, the charges are loaded into a compression mold and molded to form a unitary wheel, as represented by step 36.

Figure 3:
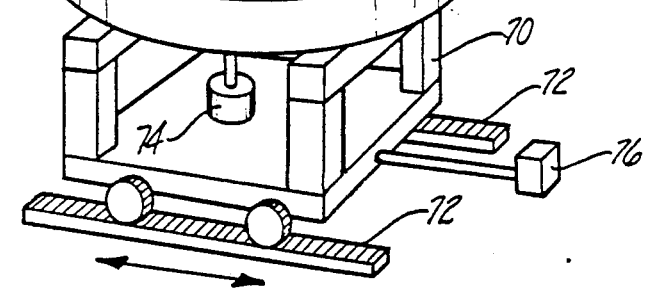
FIG. 3 is a perspective view schematically illustrating apparatus for forming the disc charge.

FIG. 3 illustrates the apparatus for producing the disc charge. A creel 38 containing a plurality of fiber bobbins or packages 40 is arranged such that the strands 42 of continuous raw fibers can be withdrawn and passed through opposing rollers 44, 46 and then through two sets of eyelets 48 and 50. The purpose of rollers 44, 46 is to guide the glass fibers, position them for straight entry into the wetout cell and apply some tension to promote resin wetout.

Figure 4:
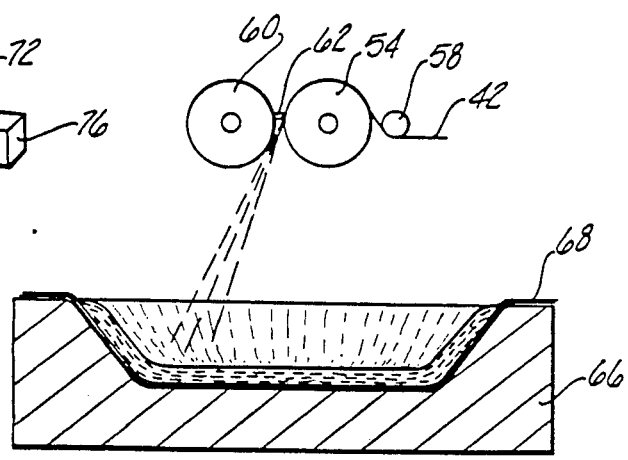
FIG. 4 is a sectional view taken along the lines 4—4 of FIG. 3 showing the cut segment falling into a receptacle for forming the disc charge.

The strands 42 are pulled through a resin bath 52 by way of a rotating drum 54. The raw fiber strands 42 passing through bath 52 are submerged in resin therein to wet the fibers in the strands. A plurality of metering orifices 56 serve to meter the resin so that a measured predetermined amount of resin remains on each of the strands. Preferably, the weight of the fibers comprise 45%-70% of the total weight of the compound, the remaining weight consisting of the resin, fillers, curing agents, thickening agents, mold release additives and the like. Various constructions can be used for impregnating bath 52 but the construction disclosed in concurrently filed and commonly assigned U.S. Pat. No. 4,643,126, issued Feb. 17, 1987. entitled "Method and Apparatus for Impregnating Fiber Strands" by Robert E. Wilkinson et al is presently preferred. This application is hereby incorporated by reference. The resin impregnated strands pass underneath bar 58 and over the rotating circumference of drum 54. A rotating cutter mechanism 60 is spaced adjacent to drum 54. Cutter mechanism 60 includes an elongated blade 62 on its periphery, with blade 62 being long enough to simultaneously cut all of the strands 42 carried by drum 54. The rotational movement of cutter 60 is synchronized with that of drum 54 so that the blade 62 cuts the resin impregnated fiber strands into a plurality of cut segments of predetermined length. These segments are generally designated by the numeral 64 and correspond to the segments 20 previously discussed in connection with the disc 12 of the final wheel construction. The segments 64 are collected in a controlled manner in a receptacle 66 so that the segments are piled together and lie in essentially a radially outwardly extending direction. With additional reference to FIG. 4, the receptacle 66 is formed into a configuration which generally corresponds to the desired shape of the disc charge. Thus, the interior of receptacle 66 is generally cup shaped which corresponds to the desired shape of the disc charge. The upper surface of receptacle 66 is provided with a sheet 68 of polyethylene/nylon plastic film or other suitable film serving as a release and storage covering.

To collect the segments 64 in a controlled manner to achieve the desired radially extending orientation, the receptacle 66 is rotated and also moved in a direction generally perpendicular to the axis of drum 54. As shown in FIG. 3, receptacle 66 is mounted on a carriage 70 riding on tracks 72. A motor 74 is connected by way of a shaft or other suitable gearing arrangement through the receptacle 66 to cause rotation thereof. Other motive means such as the mechanism shown at 76 is provided for moving the carriage along the track 72. Preferably, suitable gearing arrangements (not shown) are provided so that the same motor can be used to control rotation as well as transverse movement of the receptacle.

By this arrangement, the resin impregnated fiber segments 64 are thrown onto receptacle 66 in a region 77 thereon which generally lies on the axis of a radius of the receptacle 66. Thus, the fibers are piled together so that their lengths essentially all extend in a radially outwardly extending direction due to the rotational movement of receptacle 66 and the throwing action of the chopper blade. The transverse movement of receptacle 66 is provided to insure fairly uniform thickness of the piled segments. Once the desired weight of the compound has been reached, the operation is terminated. The charge is then removed from receptacle 66, covered by sheet 68, and allowed to thicken or "B-stage". Normally, this is accomplished by heating the charge in an oven to partially thicken the resin which is heat curable.

Turn now to FIGS. 5–16 which illustrate the preferred method of making the rim charge. The rim charge uses several layers of a sheet-molded compound material known in the trade as XMC, a trademark of PPG Industries, Inc. By way of background, the XMC compound includes essentially continuous fibers which criss-cross to form a double-helical pattern as shown in FIG. 6. In the preferred embodiment the XMC material is formed on a mandrel or drum using processes substantially similar to that disclosed in U.S. Pat. Nos. 4,220,496 and 4,220,497 which are hereby incorporated by reference. However, the XMC material used in the rim charge preferably does not include the additional swirled or chopped strands as disclosed in these background references. This is because the molding process depends on the chopped compound in the disc charge in conjunction with the hoop-wound compound in the rim charge to flow out and fill the mold. Chopped or swirled glass fibers are therefore not needed. The axial and circumferential orientation of rim compound provides satisfactory structural properties.

The continuous fibers in the XMC material, while criss-crossed, do lie essentially in the same direction since the fibers do not generally define an angle of any more than about 10 degrees with respect to the major straight line axis designated as A in FIG. 6. It will be appreciated that since the XMC material is wrapped so that the fibers extend essentially parallel to the wheel axis that this angle also holds true with respect to the wheel axis X (FIG. 1).

Turning now to FIG. 7, the rim charge is formed about a rotatable mandrel 100 which is split into two parts 102, 104, which can be pulled apart along the axial direction of the mandrel to aid in removing the rim charge after it has been formed. The circumference of the mandrel 100 is wrapped with a release film 106. As a helpful, though not critical, aid to removing the charge and maintaining it in its general shape, a sacrificial wrap 108 of fibers may be wound around the mandrel 100.

The next step is to cut the XMC compound into a plurality of sheets which are placed and shaped to the profile of the mandrel to form a first inner layer 110 as shown in FIG. 8 in which the fibers therein are oriented so that they extend essentially parallel to the wheel axis. The axial width of XMC layer 110 is somewhat longer than the ultimate desired axial length of the rim charge. The purpose of this will become apparent later herein.

Figure 9:
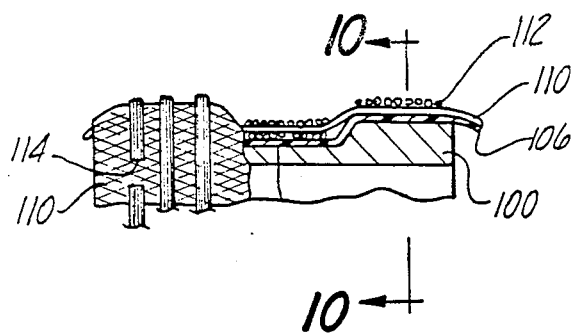
FIG. 9 is a cross-sectional view with parts cut away illustrating subsequent steps in the rim charge formation.
Figure 10:
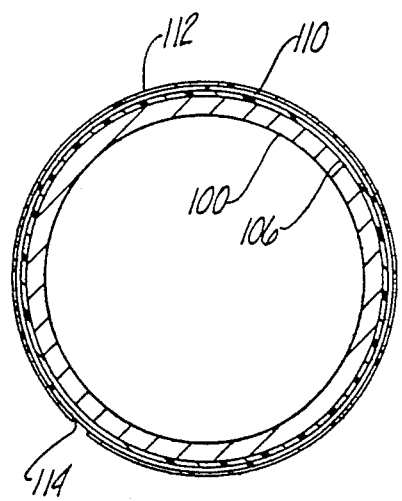
FIG. 10 is a cross-sectional view taken along the lines 10—10 of FIG. 9.

As shown in FIGS. 9 and 10, the next step is to provide a second layer 112 having fibers therein which extend substantially circumferentially of the wheel axis. The fibers of the second layer 112 consist of substantially continuous fibers which have been impregnated with resin and then wrapped around the mandrel 100. Like the disc charge, the fibers comprises 45%–70% of the total weight of the compound material. Preferably, the fibers are collimated into ribbons and these ribbons overlap to form one or more stratums comprising layer 112. The fibers of layer 112 are continuous for at least 180 degrees around the mandrel and then are cut as diagrammatically illustrated at 114. The fibers are cut in a staggered pattern so as to provide good strength by cicumferentially distributing the cuts and overlapping the compound ribbons while at the same time allowing for a certain amount of expansion of the rim charge during the molding process.

Figure 11:
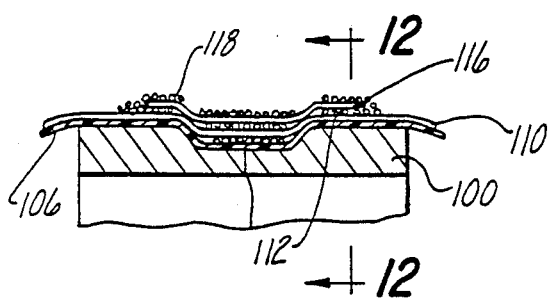
FIG. 11 is a cross-sectional view during a subsequent step in the rim charge formation process.
Figure 12:
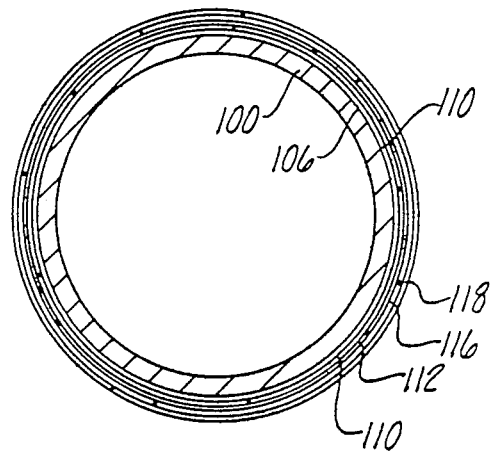
FIG. 12 is a cross-sectional view taken along the lines 12—12 of FIG. 11.
Figure 13:
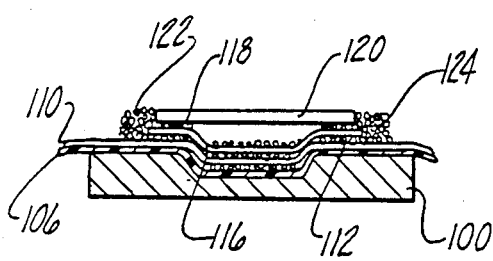
FIG. 13 is a cross-sectional view during a subsequent step in the rim formation process.

A third layer 116 of XMC compound is laid up about the mandrel over the second layer 112 as shown in FIG. 11. Again, the fibers in the XMC material extend essentially parallel to the wheel axis and opposite to the circumferentially directed fibers in layer 112.

A fourth layer 118 of circumferentially directed fibers is then formed over the third layer 116.

Figure 14:
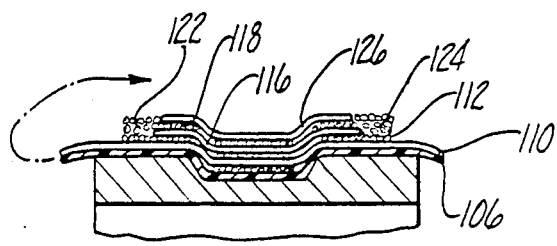
FIG. 14 is a partial cross-sectional view showing the formation of the rim charge during a subsequent step.
Figure 15:
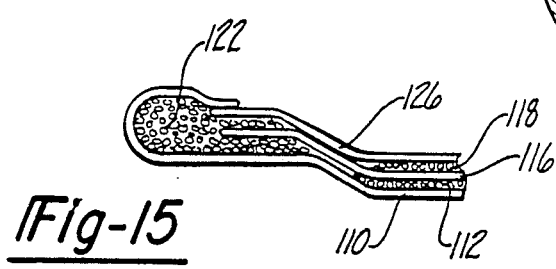
FIG. 15 is a partial cross-sectional view showing the final step in forming the rim charge.

The next general step is to provide additional circumferential reinforcement in the areas which will ultimately correspond to the bead flange areas of the rim 14. An annular fence 120 is used for the purpose of keeping the additional reinforcing fibers 122 and 124 in the two opposite axially spaced margins of the charge which will correspond to the bead flange area. As shown in FIG. 14, the fence 120 is then removed and a fifth layer 126 comprised of XMC material is laid around the mandrel 100. The fifth layer 126 has a somewhat smaller axial length so that the outer edges thereof are displaced inwardly from the additional bead flange reinforcing fibers 122 and 124. As shown in FIG. 15 the outer edges of the first XMC layer 110 are folded over the fibers 122 and 124, with the folded over edges or flaps resting on the XMC layer 126 for a small amount, just to insure continuity therebetween. As a result, the outermost layer is all made up of XMC material with fibers running essentially parallel to the wheel axis, like the fibers in the innermost layer 110.

Figure 16:
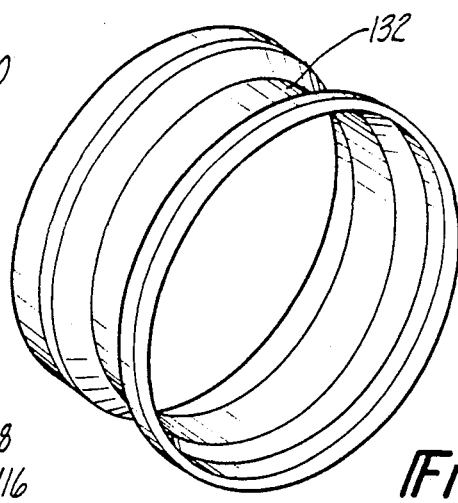
FIG. 16 is a perspective view showing the completed rim charge.

The resin in the rim charge is then allowed to thicken. Preferably, this is accomplished by placing the mandrel in an oven to heat the resin thereby "B-staging" the charge to a form where it can be handled more easily for insertion into the mold. It has been found to be particularly advantageous to wrap the mandrel with a plastic bag and evacuate the wrapped charge during this heating step for the purpose of compacting the charge and removing air from it. FIG. 16 shows the completed rim charge 132.

Figure 17:
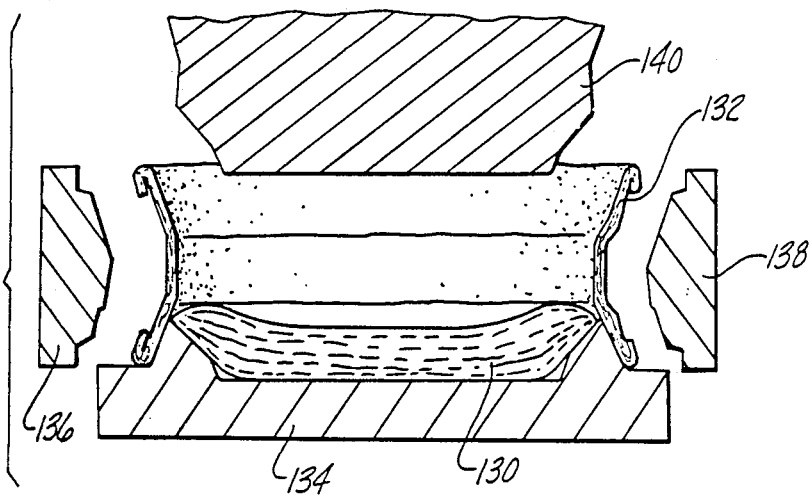
FIG. 17 is a cross-sectional view schematically illustrating the placement of the disc and rim charges into a mold.
Figure 18:
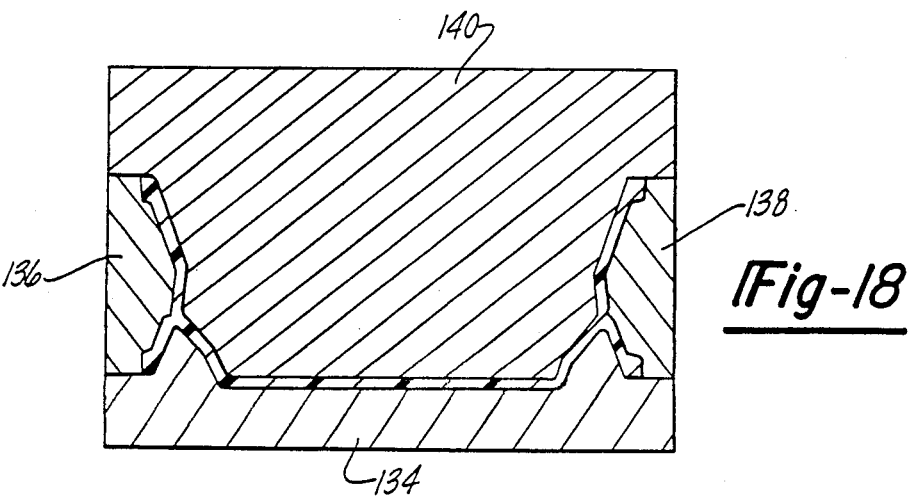
FIG. 18 is a cross-sectional view showing the mold in a closed position.

FIG. 17 shows a portion of the mold in an open condition with the disc charge 130 and rim charge 132 inserted therein. The mold has generally four members: a lower fixed member 134; two movable side members or slides 136 and 138; and a vertically movable top member 140. After the rim charge has been B-staged, the mandrel 102 is split, pulling members 102 and 104 apart to allow the charge to be removed therefrom. Plastic film wrappers are removed from both rim and disc charges. The rim charge is then inserted into the open mold as shown in FIG. 17 and the slides 136 and 138 are closed. The disc charge 130 is then inserted so that it rests within the upper surface of the lower mold 134. Preferably, the disc charge is preheated prior to insertion of the mold for the purpose of getting the charge temperature closure to that of the mold, especially in the center, so that satisfactory uniform flow of the chopped disc compound is promoted.

Then the upper mold 140 is lowered which defines the upper surface for the wheel. The disc and rim charges are then subjected to heat and pressure sufficient to cause the resin and the fibers therein to flow together and cure to form an integral truck wheel. Preferably, the mold is evacuated to about 20–29 inches Hg. during the application of heat and pressure. The vacuum operates to remove entrained air from the charge. A preferred construction of the vacuum molding apparatus is disclosed in commonly assigned U.S. Ser. No. 488,494 filed Apr. 25, 1983 entitled "Compression Molding Apparatus Having Vacuum Chamber" by Epel et al which is hereby incorporated by reference. As previously noted, the orientation of the fibers in the disc charge 130 cooperate with the fiber orientation in the innermost layer 110 of the rim charge 132 to form a good joint between the disc and rim. After the molding process is completed, the mold is opened and the completed wheel is removed from the mold.

The following example illustrates a preferred embodiment of the invention. The parts and percentages are by weight unless otherwise indicated.

EXAMPLE 1

A creel containing 12 forming packages containing Owens-Corning -475CA675 glass fiber strands are passed through a resin bath containing an anhydride curable and B-stageable epoxy heat curing resin. The cut segments are collected so that at least about 80% of the segments extend parallel to a radially outwardly extending line or radial of the charge within plus or minus 10 degrees. The rotational velocity of cutter 60 is synchronized so that it cuts the resin impregnated strands into segments approximately 1 inch in length. Receptacle 66 is rotated at about 1–10 r.p.m. and the carriage 70 moved so that the segments are piled to a height of about 5". The weight of the fibers in controlled so that the fibers comprise about 57% of the total weight of the material in the disc charge. The approximate outer diameter of the charge is 21" and the depth of the cup-shaped outer walls is approximately 1". The charge is wrapped in plastic film and removed and B-staged in an oven heated to a temperature of 100 degrees F. for a period of 24 hours.

The rim charge is preferably formed as follows. The first layer 110 of XMC material was formed by 5 sheets having an axial wdith of about 14½" and a circumferential length of about 15". The ends of the individual sheets are abutted together about the mandrel. The fibers of the XMC layers comprise about 55% to 60% of the total weight. The second layer 112 was formed from 9 filament winding glass fiber strands impregnated with anhydride-curable, B-stageable epoxy heat-curing resin with the fibers again comprising 55% to 60% of the total weight. Layer 112 is formed by making 2 back-and-forth passes of the resin impregnated strands which are periodically cut in a staggered fashion. The thickness of layer 112 is about 0.050". The third layer 116 is formed of 5 XMC sheets abutted together. The axial width of layer 116 is about 8.5". The fourth layer 118 of circumferential fibers is formed by making 2 back-and-forth passes to thereby form a thickness of about 0.050".

The axial width of fence 120 is about 8.5" and it has a thickness of about 0.25". Additional reinforcing fibers 122 and 124 are included by making several passes to achieve a thickness of about 0.25". The last XMC layer 126 has an axial width of about 10" and the flap of the first layer 110 overlaps layer 126 by about 1.5".

The rim charge is B-staged by heating it in an oven for 21 hours at a temperature of about 100 degrees F. under a vacuum of about 25 inches Hg.

After B-staging, the rim and disc charge can be stored in a controlled environment until they are ready for insertion into the mold. Preferably, the disc charge 130 is dielectrically preheated to a temperature of 140 degrees F. for a period of about 3 minutes prior to insertion in the mold. The mold is heated to a temperature of about 320 degrees F. and the disc and rim charge are compressed under a pressure of about 1200 psi for a period of 1 hour and then removed from the mold.

Various modifications will become apparent to the skilled practitioner upon a study of the specification, drawings, and following claims. For example, it is possible to substitute carbon fibers or aramid fibers or even form hybrid mold charges in place of or in conjunction with glass fibers. The resin system can be polyester, vinyl ester, or even high-performance thermoplastic such as polyethersulphone. As for the fiber-reinforced compound used, fiber weight percentages can be adjusted to suit, within suitable limits. Fiber angles and compound thickness can be varied to provide a degree of structural adjustment.

Therefore, the scope of the present invention should not be construed as being limited to the particular examples herein.

I claim:

1. A composite wheel for a motor vehicle made of fiber reinforced resin and adapted for mounting a ground engaging tire, said wheel comprising:

a rim having a plurality of radially disposed substantially distinct fiber layers with the radially inner and radially outer layers having fibers predominantly unidirectionally oriented in a direction generally parallel to the axis of rotation of said wheel, said inner and outer layers joining at the axis ends of said wheel to define tire bead retaining flanges, said rim further having at least one intermediate fiber layer sandwiched between said inner and outer layers having fibers oriented transverse to said fibers of said inner and outer layers, and a disc portion having fibers predominantly oriented in a radially outward extending direction and joining said rim at said inner layer.

2. A composite wheel according to claim 1 wherein the fibers of said disc and said rim inner layer are in substantially parallel interrelation at the junction between said rim and said disc to provide a structurally secure joint therebetween.

3. A composite wheel according to claim 1 wherein said rim intermediate layer includes a first layer having essentially continuous direction fibers extending circumferentially of the wheel axis, a second layer having directional fibers extending in a direction essentially parallel to the wheel axis, a third layer having essentially continuous direction fibers extending circumferentially of the wheel axis, and additional reinforcing fibers in the two bead retaining flanges of the wheel extending circumferentially thereof.

4. A composite wheel according to claim 1, wherein the reinforcing fiber segments in the disc comprise 45% to 70% of the total weight of the material in the disc, and lengths of about ½ to 2 inches.

5. A composite wheel according to claim 1, wherein said inner and outer layers having directional fibers extending in a direction essentially parallel to the wheel axis comprises directional fibers disposed in a symmetrical cross pattern.

6. A composite wheel according to claim 5 wherein said cross pattern is at an angle of between 2 degrees and 10 degrees with respect to the wheel axis.

7. A composite wheel according to claim 1, wherein the weight of the fibers in the layers of the rim comprise 45% to 70% of the total weight of the material in each layer.

* * * * *